(12) United States Patent
Park et al.

(10) Patent No.: US 12,715,528 B2
(45) Date of Patent: Aug. 25, 2026

(54) INTEGRATED TWO-WHEEL DRIVE MODULE AND METHOD OF JOINING INTEGRATED TWO-WHEEL DRIVE MODULE AND CABIN

(71) Applicants: Hyundai Motor Company, Seoul (KR); Kia Corporation, Seoul (KR)

(72) Inventors: Danghee Park, Seoul (KR); DaeJin Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 383 days.

(21) Appl. No.: 18/511,439

(22) Filed: Nov. 16, 2023

(65) Prior Publication Data

US 2025/0074523 A1 Mar. 6, 2025

(30) Foreign Application Priority Data

Sep. 6, 2023 (KR) ........................ 10-2023-0118360

(51) Int. Cl.

*B62D 63/02* (2006.01)
*B60G 13/00* (2006.01)
*B60K 7/00* (2006.01)
*B62D 7/20* (2006.01)

(52) U.S. Cl.

CPC ......... *B62D 63/025* (2013.01); *B60G 13/001* (2013.01); *B60K 7/0007* (2013.01); *B62D 7/20* (2013.01)

(58) Field of Classification Search

CPC ...... B62D 63/025; B62D 7/20; B60G 13/001; B60K 7/0007

See application file for complete search history.

(56) References Cited

U.S. PATENT DOCUMENTS

| | | | | |
|---|---|---|---|---|
| 11,820,458 | B2 * | 11/2023 | Naik | B62K 5/01 |
| 2009/0032321 | A1 * | 2/2009 | Marsh | B60K 6/52 903/906 |
| 2011/0017527 | A1 * | 1/2011 | Oriet | B60S 13/00 296/186.4 |
| 2014/0004761 | A1 * | 1/2014 | Neprud | B60F 3/0069 440/12.5 |
| 2023/0391154 | A1 * | 12/2023 | Choi | B60G 3/20 |

FOREIGN PATENT DOCUMENTS

| | | |
|---|---|---|
| KR | 102510862 B1 | 3/2023 |
| KR | 102512092 B1 | 3/2023 |

* cited by examiner

*Primary Examiner* — Edwin A Young
(74) *Attorney, Agent, or Firm* — Slater Matsil, LLP

(57) ABSTRACT

An integrated two-wheel drive module includes a module body, wherein each side portion of the module body extends upward to define a space and an upper end of each side portion extends to one side to define a shoulder portion, a battery and a controller disposed in the module body, a pair of wheels mounted on both side surfaces of the module body, wheel frames disposed in each of the wheels, wherein the wheels are rotatable with respect to the wheel frames, in-wheel motors mounted in each of the wheel frames, joining brackets disposed on a first surface of each of the wheel frames, respectively, a steering device mounted in the module body and connected to each of the wheel frames through respective ball joints, and suspensions mounted between the shoulder portions of the module body and the joining brackets.

20 Claims, 11 Drawing Sheets

INTEGRATED TWO-WHEEL DRIVE MODULE AND METHOD OF JOINING INTEGRATED TWO-WHEEL DRIVE MODULE AND CABIN

CROSS-REFERENCE TO RELATED APPLICATIONS

This application claims the benefit of Korean Patent Application No. 10-2023-0118360, filed on Sep. 6, 2023, which application is hereby incorporated herein by reference.

TECHNICAL FIELD

The present disclosure relates to an integrated two-wheel drive module and a method of joining an integrated two-wheel drive module and a cabin.

BACKGROUND

In recent years, some vehicle and auto component manufacturers have focused on developing a standardized and scalable electric vehicle (EV) platform that underpins a future vehicle based on an entirely new vehicle architecture in order to save development time and cost and thus get a new electric vehicle on the road more quickly. To this end, a modular electric rolling and ready-to-run platform, also known as a "skateboard", may be specially designed to be coupled with a body of any of various types or shapes. In this approach method, a vehicle platform may indicate parts common to all vehicles and may include a chassis, a powertrain, an energy storage, a crash management, and the like that are coupled with each other. On the other hand, an upper body structure or a "top hat" may be provided with several variations specifically designed for various usages based on a customer's specific need.

This purpose-built vehicle (PBV) may be designed for a specific application, such as a last-mile delivery or an autonomous shuttle. The PBV may be designed for the specific application from the beginning, and an effort has been made to standardize the PBV in advance. Therefore, the PBV may be produced at a large scale and at a much lower cost than another method.

However, even when using a skateboard-top hat structure, the PBV may not satisfy a user's various needs. For example, a user may want to use the PBV as a compact two-wheel drive electric vehicle when commuting to or from work, but may want to use the PBV as a powerful four-wheel drive electric vehicle when traveling or engaging in hobbies. However, this conventional skateboard-top hat structure may not have flexibility of skateboard design and fails to satisfy the user's needs.

The above information disclosed in this background section is provided only to assist in better understanding of the background of embodiments of the present disclosure and may thus include information not included in the prior art already known to those skilled in the art to which the present disclosure pertains.

SUMMARY

The present disclosure relates to an integrated two-wheel drive module and a method of joining an integrated two-wheel drive module and a cabin. Particular embodiments relate to an integrated two-wheel drive module which may independently run as an electric mobility by integrating an in-wheel motor, a steering device, and a suspension into a module body, and a method of joining an integrated two-wheel drive module to a purpose-built cabin.

Embodiments of the present disclosure provide an integrated two-wheel drive module which may independently run as an electric mobility by integrating an in-wheel motor, a steering device, and a suspension into a module body.

Embodiments of the present disclosure also provide a method of joining an integrated two-wheel drive module and a cabin to implement a purpose-built vehicle satisfying a user's need.

According to an embodiment, an integrated two-wheel drive module includes a module body having a battery and a controller provided in the module body, a pair of wheels mounted on both side surfaces of the module body and being rotatable with respect to each wheel frame disposed in each wheel, an in-wheel motor mounted in the wheel frame and rotating the wheel by receiving power from the battery under control of the controller, a steering device mounted in the module body and connected to the wheel frame through a ball joint, and a suspension mounted between the module body and the wheel frame and absorbing impact of a road surface that is transmitted from the wheel such that the impact is not transmitted to the module body, wherein each side portion of the module body extends upward to provide a space for the wheel, an upper end of each side portion extends to one side to form a shoulder portion, a joining bracket is provided on one surface of the wheel frame, the steering device receives the power from the battery under the control of the controller and rotates the wheel frame in a horizontal direction with respect to a connection point between the suspension and the joining bracket, and the suspension is mounted between the shoulder portion and the joining bracket.

The steering device may include a steering actuator mounted on the module body and operated by receiving the power from the battery under the control of the controller and a steering rod having one end connected to the steering actuator to be moved forward or backward by receiving a force from the steering actuator and having the other end connected to the wheel frame through the ball joint.

The other end of the steering rod may be connected to the wheel frame at a front or a rear with respect to an imaginary vertical line passing through the connection point between the suspension and the joining bracket.

The pair of steering rods and the pair of steering actuators may be provided, and the pair of steering rods may be connected respectively to the wheel frame at the front and the rear with respect to an imaginary vertical line passing through the connection point between the suspension and the joining bracket.

The suspension may include a suspension damper having one end coupled to a lower surface of the shoulder portion and the other end extending downward and a suspension actuator having one end connected to the other end of the suspension damper and the other end connected to the joining bracket and operated by receiving the power from the battery under the control of the controller.

The suspension actuator may change a distance between the one end of the suspension actuator and the joining bracket by receiving the power.

The other end portion of the suspension actuator may be formed as a step portion having a reduced diameter, a through hole may be formed at the joining bracket, the step portion may be inserted into the through hole formed at the joining bracket, and a fixing member may be coupled to an outer peripheral surface of the step portion.

A bearing may be disposed between the other end portion of the suspension actuator having a diameter larger than that of the step portion and the joining bracket or between the fixing member and the joining bracket.

The suspension damper may be connected to the suspension actuator through a support.

The plurality of joining protrusions may be disposed on an upper, front, or rear surface of the module body. The integrated two-wheel drive module may further include a connector which is coupled to a selected joining protrusion among the plurality of joining protrusions and to which a joining portion provided on a cabin is engageable.

The connector may be screw-coupled to the joining protrusion.

A joining slot penetrating through the joining portion may be formed at a predetermined position of the joining portion, a connector groove corresponding to the joining slot may be formed in an outer peripheral surface of the connector, and the joining portion and the connector may be joined with each other by inserting a pin into the joining slot and the joining portion groove.

According to another embodiment, a method of joining an integrated two-wheel drive module and a cabin is provided. The method includes preparing an integrated two-wheel drive module which includes a module body having a battery and a controller provided in the module body and having a plurality of joining protrusions provided on an upper, front, or rear surface of the module body, a connector coupled to the selected joining protrusion among the plurality of joining protrusions, a pair of wheels mounted on both side surfaces of the module body and being rotatable with respect to each wheel frame disposed in each wheel, an in-wheel motor mounted in the wheel frame and rotating the wheel by receiving power from the battery under control of the controller, a steering device mounted in the module body and connected to the wheel frame through a ball joint, a suspension mounted between the module body and the wheel frame, and a cabin having a joining portion which is engageable to the connector. The method further includes moving, by the controller, the integrated two-wheel drive module toward the cabin, detecting, by the controller, a position of the joining portion of the cabin and a position of the connector joined to the integrated two-wheel drive module, adjusting, by the controller, a position and a height of the integrated drive module based on the positions of the joining portion and the connector, and coupling, by the controller, the connector with the joining portion by moving the integrated two-wheel drive module.

The method may further include inserting a pin into a joining slot penetrating through the joining portion and a connector groove formed in an outer peripheral surface of the connector and corresponding to the joining slot.

The method may further include controlling, by the controller, the suspension to increase a height of the integrated two-wheel drive module to a predetermined ground clearance.

According to embodiments of the present disclosure, the integrated two-wheel drive module may be used as the electric mobility by integrating the in-wheel motor, the steering device, and the suspension into the module body. Therefore, a user may run the mobility by using the integrated two-wheel drive module itself, using the integrated two-wheel drive module as a two-wheel drive purpose-built electric vehicle by joining one integrated two-wheel drive module to the purpose-built cabin, or using the two integrated two-wheel drive modules as the four-wheel drive purpose-built electric vehicle by joining the two integrated two-wheel drive modules to the purpose-built electric vehicle.

In addition, no separate equipment may be required to join the integrated two-wheel drive module with the cabin. Therefore, the integrated two-wheel drive module and the cabin may be easily joined with each other regardless of a location or an equipment. In addition, the purpose-built mobility may be used by replacing the cabin based on the purpose.

Other effects which may be obtained or predicted by embodiments of the present disclosure are disclosed directly or implicitly in the detailed description of the embodiments of the present disclosure. That is, various effects predicted based on the embodiments of the present disclosure are disclosed in the detailed description described below.

BRIEF DESCRIPTION OF THE DRAWINGS

Embodiments in the specification may be better understood by referring to the following description in connection with the accompanying drawings in which like reference numerals refer to identical or functionally similar elements.

FIG. 2 is a schematic view showing one side portion of an integrated two-wheel drive module according to an embodiment of the present disclosure.

FIG. 5 is a perspective view schematically showing an integrated two-wheel drive module according to another embodiment of the present disclosure.

Figure 1:
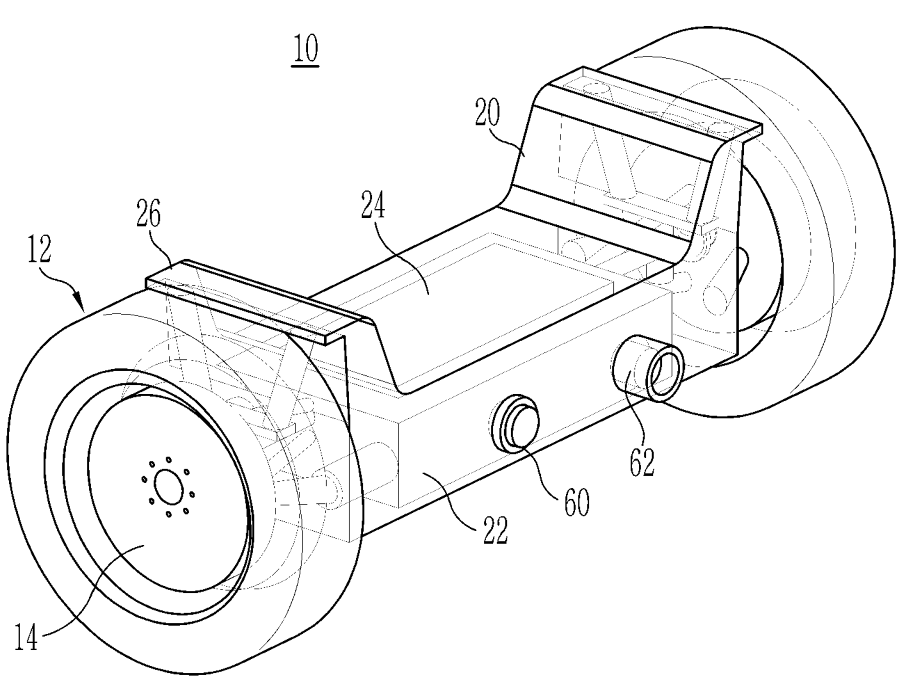
FIG. 1 is a perspective view schematically showing an integrated two-wheel drive module according to an embodiment of the present disclosure.

It should be understood that the drawings referenced above are not necessarily drawn to scale and present a rather simplified representation of various preferred features showing the basic principles of embodiments of the present disclosure. For example, specific design features, including a specific dimension, orientation, position, and shape, are determined in part by the particular intended application and environment of use.

DETAILED DESCRIPTION OF ILLUSTRATIVE EMBODIMENTS

A term used herein is only to describe a specific embodiment and is not intended to limit the embodiments of the present disclosure. A term of a singular number used herein is intended to include its plural number unless the context clearly indicates otherwise. It should also be understood that the terms "include" and/or "including," when used in the specification, specify the presence of the recited features, integers, steps, operations, elements, and/or components and do not exclude the presence or addition of one or more of other features, integers, steps, operations, elements, components, and/or groups thereof. A term "and/or" used herein includes any one or all combinations of the associated listed items.

"A vehicle," "of a vehicle," or other similar terms used herein generally refer to an automobile including a passenger vehicle including a sport utility vehicle (SUV), a bus, a truck, various commercial vehicles, or the like, and also refer to a hybrid vehicle, an electric vehicle, a plug-in hybrid electric vehicle, a hydrogen-powered vehicle, and a vehicle using another alternative fuel (e.g., fuel derived from a resource other than petroleum). As mentioned herein, the hybrid vehicle is a vehicle having two or more power sources, for example, a gasoline-powered and electric-powered vehicle. A vehicle according to embodiments of the present disclosure may include a manually driven vehicle as well as a vehicle driven more or less autonomously and/or automatically.

Further, it is to be understood that one or more of methods described below or aspects thereof may be executed by at least one or more controllers. The term "controller" may refer to a hardware device including a memory and a processor. The memory may store program instructions, and the processor may be specifically programmed to execute the program instructions to perform one or more processes described below in more detail. The controller may control operations of units, modules, parts, devices, or the like as described herein. It is also to be understood that the methods described below may be executed by an apparatus including the controller in conjunction with one or more other components as appreciated by those skilled in the art.

In addition, the controller of embodiments of the present disclosure may be implemented as a non-transitory computer-readable recording medium including executable program instructions executed by the processor. An example of the computer-readable recording medium may include a read only memory (ROM), a random access memory (RAM), a compact disk read only memory (CD-ROM), a magnetic tape, a floppy disk, a flash drive, a smart card, or an optical data storage device, and embodiments of the present disclosure are not limited thereto. The computer-readable recording medium may also be distributed throughout a computer network, and the program instructions may thus be stored and executed in a distributed manner, for example, on a telematics server or a controller area network (CAN).

Hereinafter, embodiments of the present disclosure are described in detail with reference to the accompanying drawings.

Figure 2:
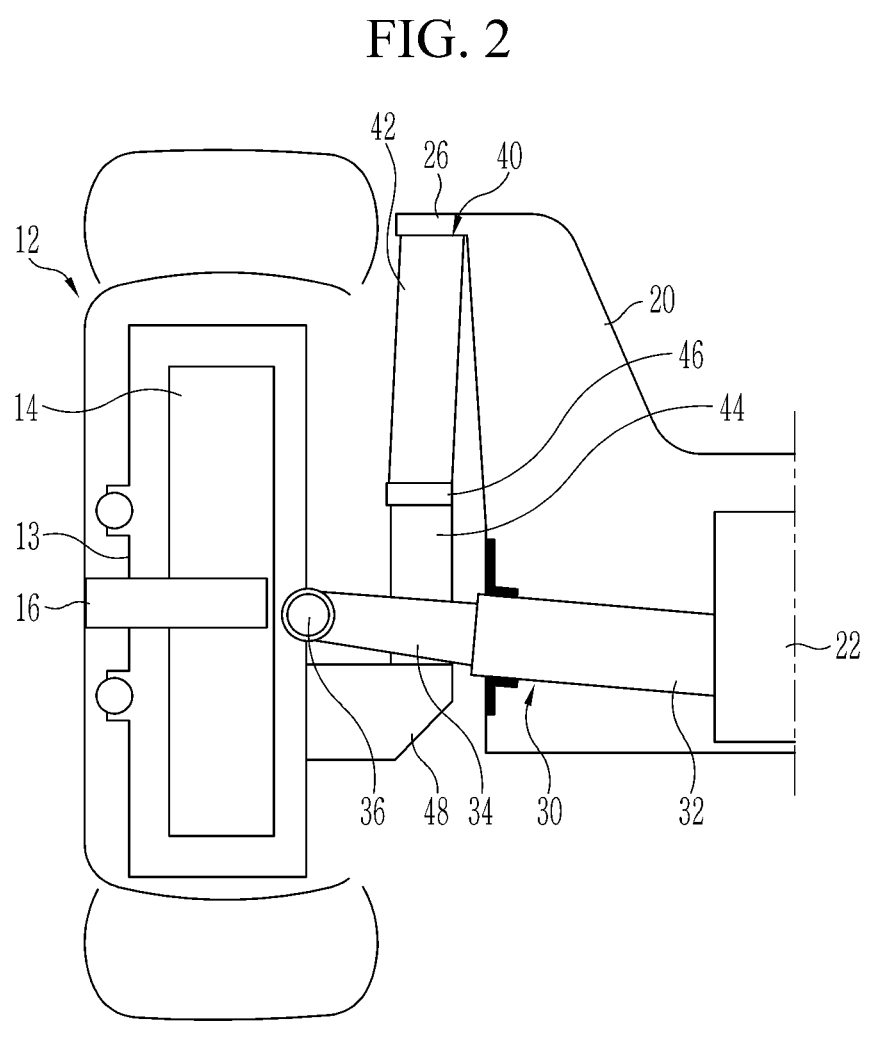
Figure 3:
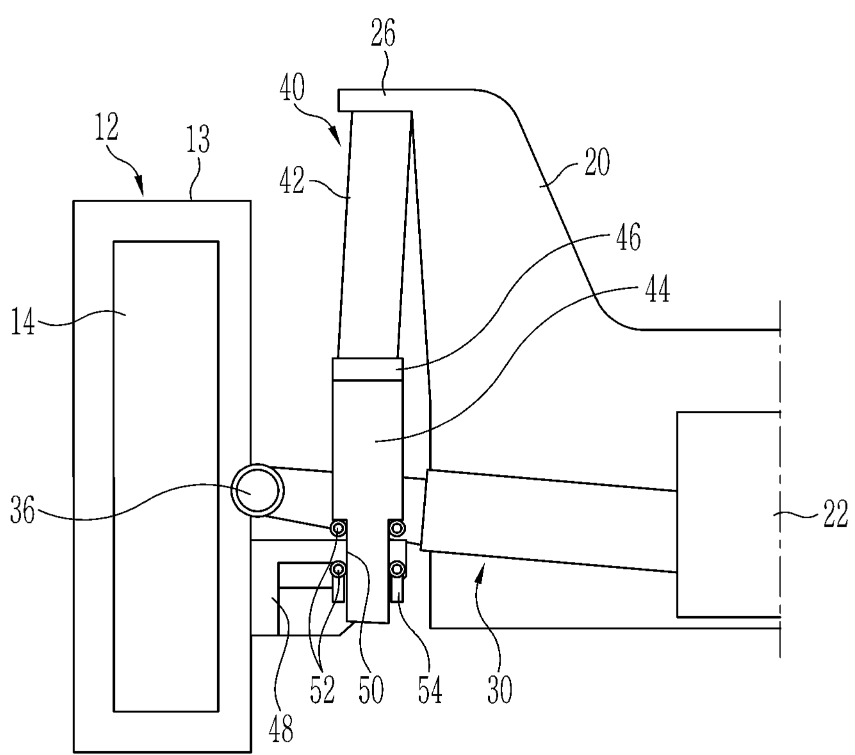
FIG. 3 is another schematic view showing one side portion of an integrated two-wheel drive module according to an embodiment of the present disclosure.
Figure 4:
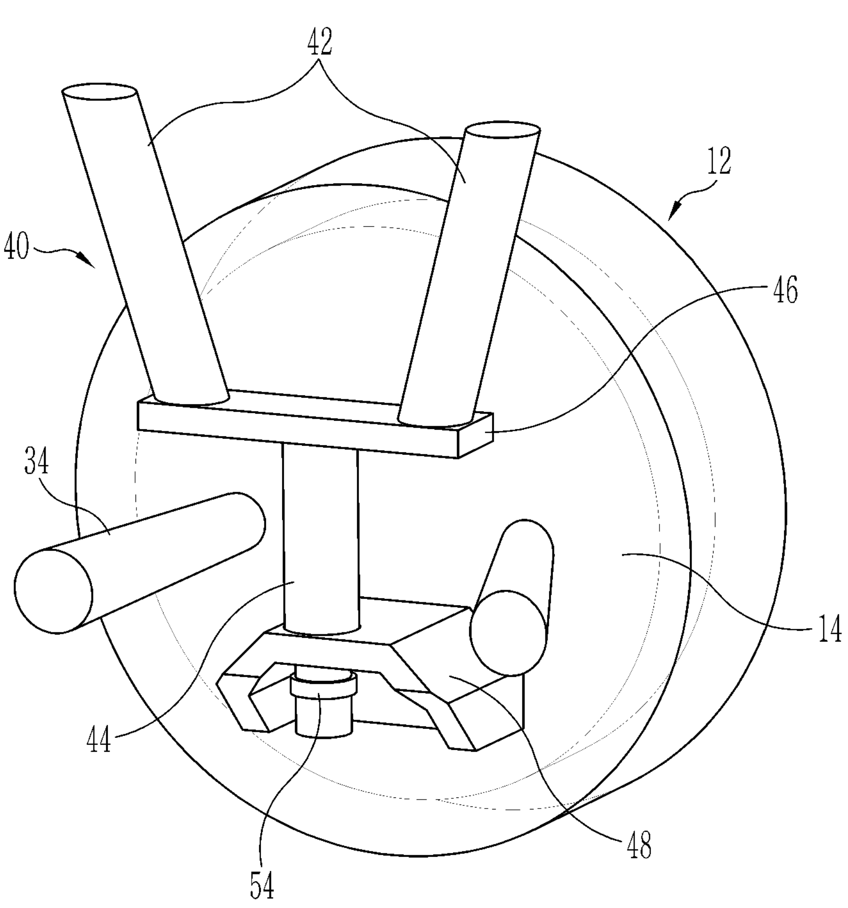
FIG. 4 is a perspective view schematically showing one side portion of an integrated two-wheel drive module according to an embodiment of the present disclosure.
Figure 5:
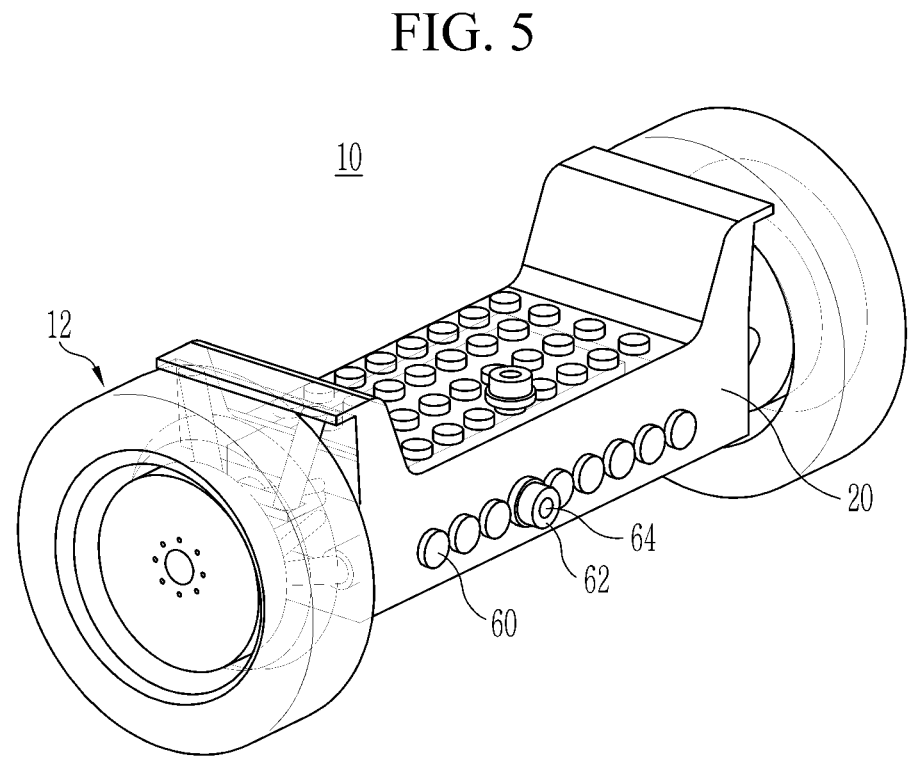

FIG. 1 is a perspective view schematically showing an integrated two-wheel drive module according to an embodiment of the present disclosure; FIG. 2 is a schematic view showing one side portion of an integrated two-wheel drive module according to an embodiment of the present disclosure; FIG. 3 is another schematic view showing one side portion of an integrated two-wheel drive module according to an embodiment of the present disclosure; FIG. 4 is a perspective view schematically showing one side portion of an integrated two-wheel drive module according to an embodiment of the present disclosure; and FIG. 5 is a perspective view schematically showing an integrated two-wheel drive module according to another embodiment of the present disclosure.

As shown in FIG. 1, an integrated two-wheel drive module 10 according to an embodiment of the present disclosure may include a module body 20, a pair of wheels 12, at least one in-wheel motor 14, a steering device 30, and a suspension 40.

The module body 20 may generally have a rectangular parallelepiped shape. The rectangular parallelepiped shape may have a width greater than a length, and embodiments of the present disclosure are not limited thereto. The module body 20 may have a battery 22 and a controller 24 disposed therein. The battery 22 may supply power to a driving component and/or an electrical component including at least one in-wheel motor 14. The controller 24 may control an operation of the battery 22, the driving component, and/or the electrical component including the in-wheel motor 14.

As shown in FIGS. 2 and 3, each side portion of the module body 20 may extend generally upward to provide a space for the wheel 12, and an upper end of each side portion may extend to one side to form a shoulder portion 26. One end of the suspension 40 may be mounted on a lower surface of the shoulder portion 26.

Each of the pair of wheels 12 may be mounted on a side surface of the module body 20 through the steering device 30. A wheel frame 13 may be provided in the wheel 12, the wheel 12 may be rotatable with respect to the wheel frame 13, and the integrated two-wheel drive module 10 may thus run by the pair of wheels 12.

The in-wheel motor 14 may be mounted in the wheel frame 13. The in-wheel motor 14 may include a rotatable motor shaft 16, and the motor shaft 16 may penetrate through the wheel frame 13 to be connected to the wheel 12. The in-wheel motor 14 may rotate the motor shaft 16 by receiving power from the battery 22 under a control of the controller 24. In this case, the wheel 12 connected to the motor shaft 16 may also be rotated, and the integrated two-wheel drive module 10 may be moved forward or backward.

A joining bracket 48 may be disposed on one surface of the wheel frame 13 that faces the module body 20. The joining bracket 48 may have a predetermined shape, and the other end of the suspension 40 is rotatably connected to the joining bracket 48.

The one surface of the wheel frame 13 that faces the module body 20 may be connected to the steering device 30 through a ball joint 36. Accordingly, the wheel frame 13 may be rotated with respect to the steering device 30 in a vertical direction and a horizontal direction through the ball joint 36.

At least one joining protrusion 60 may be provided on the module body 20. For example, as shown in FIG. 5, the plurality of joining protrusions 60 may be provided on an upper, a front, and/or a rear surface(s) of the module body 20, and a connector 62 may be joined to the selected joining protrusion 60 among the plurality of joining protrusions 60 to be coupled with a joining portion 70 of a cabin 80 or the like. Accordingly, the integrated two-wheel drive module 10 and the cabin 80 or the like may be easily coupled with each other, and the purpose-built cabin 80 may be coupled to a position of the integrated two-wheel drive module 10 suitable for a desired purpose. A coupling of the joining protrusion 60, the connector 62, and the joining portion 70 will hereinafter be described in more detail.

As shown in FIGS. 2 to 4, the steering device 30 may be mounted in the module body 20, connected to the wheel frame 13 through the ball joint 36, and configured to rotate the wheel frame 13 in the horizontal direction to steer the integrated two-wheel drive module 10. The steering device 30 may include a steering actuator 32 and a steering rod 34.

The steering actuator 32 may be mounted on the module body 20. The steering actuator 32 may be connected to the battery 22 and the controller 24 and operated by receiving power from the battery 22 under the control of the controller 24. For example, the controller 24 may transmit a steering instruction to the battery 22 and/or the steering actuator 32 when determining that a running direction of the integrated two-wheel drive module 10 needs to be changed based on an input from a user or an input from a sensor (not shown). The battery 22 may operate the steering actuator 32 by supplying the power required by the steering instruction to the steering actuator 32.

The steering rod 34 may have one end connected to the steering actuator 32 to be moved forward or backward by receiving a force from the steering actuator 32 and have the other end connected to the wheel frame 13 through the ball joint 36 to rotate the wheel frame 13 in the horizontal direction with respect to a connection point between the suspension 40 and the joining bracket 48. In more detail, the other end of the steering rod 34 may be connected to the wheel frame 13 at a front or a rear with respect to an imaginary vertical line passing through the connection point between the suspension 40 and the joining bracket 48. Therefore, when moved forward from the steering actuator 32 or backward toward the steering actuator 32 due to the operation of the steering actuator 32, the steering rod 34 may rotate the wheel frame 13 in the horizontal direction with respect to the connection point between the suspension 40 and the joining bracket 48. It is thus possible to implement the steering of the integrated two-wheel drive module 10.

In an example, as shown in FIG. 4, the pair of steering rods 34 may each be connected to the wheel frame 13 at the front and the rear with respect to the imaginary vertical line passing through the connection point between the suspension 40 and the joining bracket 48. In addition, the pair of steering rods 34 may each be connected to the corresponding steering actuator 32 among the pair of steering actuators 32. However, the number of steering rods 34 or the number of steering actuators 32 is not limited thereto. That is, it is possible to implement the steering by connecting at least one steering rod 34 and the steering actuator 32 to the wheel frame 13 at the front or the rear with respect to the imaginary vertical line passing through the connection point between the suspension 40 and the joining bracket 48.

As shown in FIGS. 2 to 4, the suspension 40 may be mounted between the module body 20, particularly the shoulder portion 26, and the wheel frame 13, particularly the joining bracket 48, and may absorb impact from a road surface that is transmitted from the wheel 12 for this impact not to be transmitted to the module body 20. The suspension 40 may include a suspension damper 42 and a suspension actuator 44.

The suspension damper 42 may have one end coupled to a lower surface of the shoulder portion 26 and the other end extending downward to be connected to the suspension actuator 44. The suspension damper 42 may absorb the impact from the road surface through a damping action. The type and structure of the suspension damper 42 are not particularly limited, and the suspension damper 42 of any type and structure may be used as long as the suspension damper 42 may absorb the impact transmitted from the road surface.

The suspension actuator 44 may have one end connected to the other end of the suspension damper 42 and the other end connected to the joining bracket 48 to thus transmit the impact transmitted from the road surface to the suspension damper 42. The suspension actuator 44 may be connected to the battery 22 and the controller 24 and operated by receiving power from the battery 22 under the control of the controller 24. For example, the controller 24 may transmit an operation instruction to the battery 22 and/or the suspension actuator 44 when determining an operation time and an operation force of the suspension actuator 44 based on an input (for example, a magnitude and a frequency of the impact transmitted from the road surface) from the sensor (not shown). The battery 22 may operate the suspension actuator 44 by supplying the power required by the operation instruction to the suspension actuator 44. The suspension actuator 44 may change a distance between the one end of the suspension actuator 44 and the joining bracket 48 by supplying the power to thus partially absorb the impact from the road surface. The suspension actuator 44 may be operated quickly by an electrical signal. Therefore, the suspension actuator 44 may function as a spring of a conventional strut-type suspension, and the suspension damper 42 may function as a strut of the conventional strut-type suspension.

The other end of the suspension actuator 44 may be rotatably connected to the joining bracket 48. Accordingly, the wheel frame 13 may be rotated by the steering device 30 in the horizontal direction with respect to the connection point between the other end of the suspension actuator 44 and the joining bracket 48. Therefore, both the suspension and steering functions may be implemented through the electric actuators. In order to rotatably connect the other end of the suspension actuator 44 to the joining bracket 48, the other end of the suspension actuator 44 may be formed as a step portion having a reduced diameter, the step portion may be inserted into a through hole 50 formed at the joining bracket 48, and a fixing member 54, such as a snap ring, may be coupled to an outer peripheral surface of the step portion. In addition, a bearing 52 may be disposed between the other end of the suspension actuator 44 having a larger diameter and the joining bracket 48 or between the fixing member 54 and the joining bracket 48. Therefore, the suspension actuator 44 may be joined to the joining bracket 48 by the step portion and the fixing member 54 to thus receive the impact from the road surface through the wheel 12, the wheel frame 13, and the joining bracket 48. The wheel frame 13 may be rotated by the bearing 52 in the horizontal direction with respect to the connection point between the other end of the suspension actuator 44 and the joining bracket 48.

Meanwhile, as shown in FIGS. 2 to 4, the suspension damper 42 may be connected to the suspension actuator 44 through a support 46. In an example, as shown in FIG. 4, the other end of each of the pair of suspension dampers 42 may be connected to an upper surface of the support 46, and the one end of suspension actuator 44 may be connected to a lower surface of the support 46. Accordingly, the suspension actuator 44 may transmit the impact from the road surface that is transmitted through the wheel 12, the wheel frame 13, and the joining bracket 48 to the suspension damper 42 through the support 46. Here, it is exemplified that the suspension actuator 44 is connected to the pair of suspension dampers 42 through the support 46, but the number of suspension dampers 42 and the presence or absence of the support 46 are not limited thereto. For example, the suspension actuator 44 may be directly connected to one suspension damper 42.

The integrated two-wheel drive module 10 according to an embodiment of the present disclosure may be joined to various types of the cabin 80. To this end, as shown in FIG.

5, the plurality of joining protrusions 60 may be disposed on the upper, the front, and/or the rear surface(s) of the module body 20, and the connector 62 may be coupled to the selected joining protrusion 60 among the plurality of joining protrusions 60. In addition, the joining portion 70 may be provided on the cabin 80 or the like, and the joining portion 70 may thus be joined with the connector 62. Hereinafter, the joining of the joining portion 70 and the connector 62 will hereinafter be described in more detail with reference to FIGS. 6 and 7.

Figure 6:
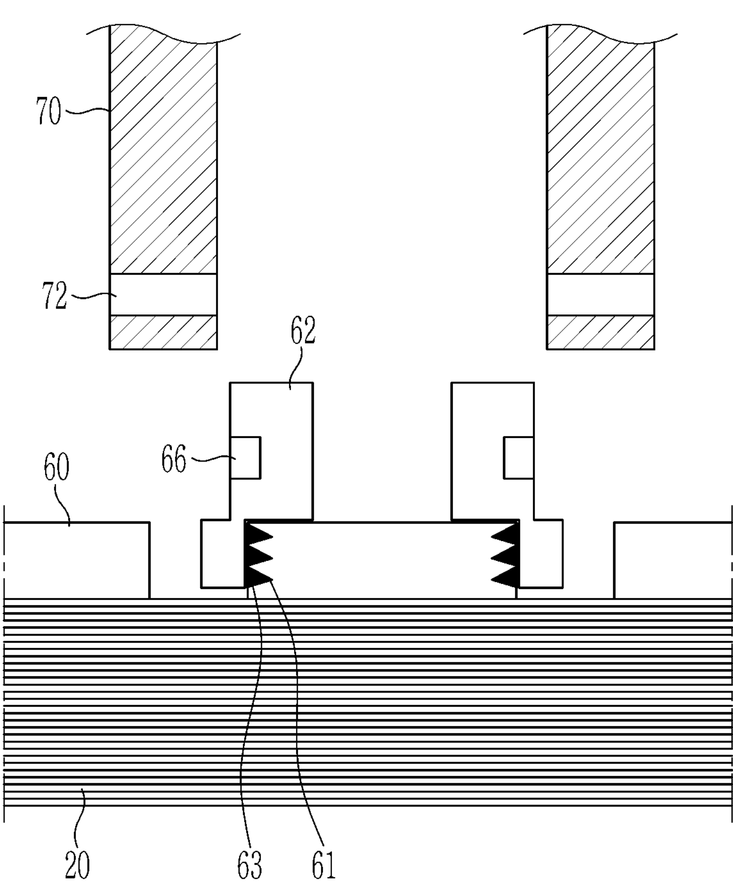
FIG. 6 is a schematic view showing a joining portion and a joining protrusion before being joined with each other.
Figure 7:
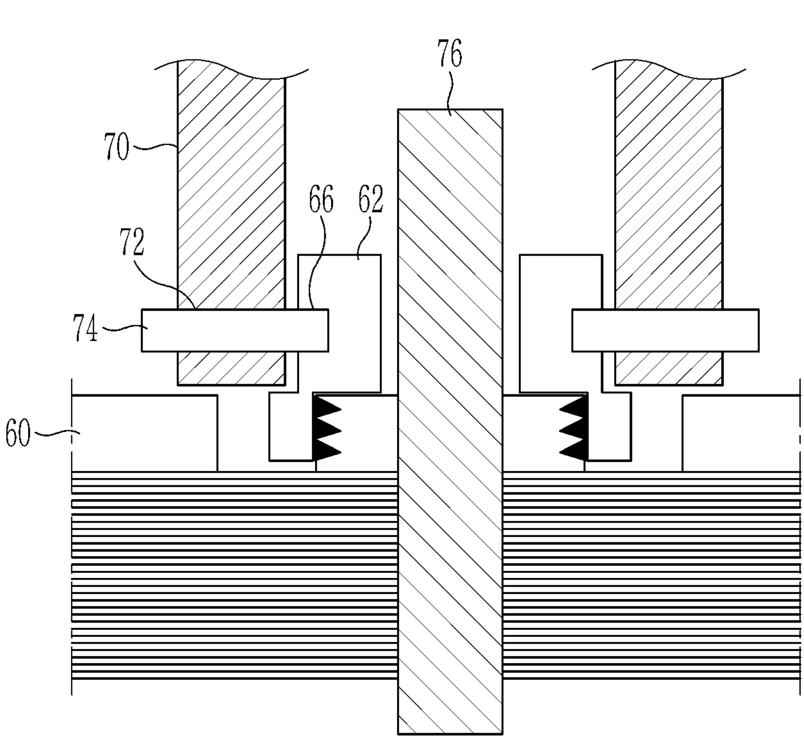
FIG. 7 is a schematic view showing a joining portion and a joining protrusion after being joined with each other.

FIG. 6 is a schematic view showing a joining portion and a joining protrusion before being joined with each other; and FIG. 7 is a schematic view showing a joining portion and a joining protrusion after being joined with each other.

As shown in FIGS. 6 and 7, a first screw thread 61 may be formed on an outer peripheral surface of the joining protrusion 60, and a second screw thread 63 corresponding to the first screw thread 61 may be formed on an inner peripheral surface of the connector 62. The connector 62 may be coupled to the selected joining protrusion 60 by screw-coupling the second screw thread 63 of the connector 62 to the first screw thread 61 of the selected joining protrusion 60.

The joining portion 70 may be provided on the cabin 80. A diameter of the inner peripheral surface of the joining portion 70 may be larger than a diameter of an outer peripheral surface of the connector 62, and the joining portion 70 may be fitted into the outer peripheral surface of the connector 62. In addition, a joining slot 72 penetrating through the joining portion 70 in a radial direction may be formed in a predetermined position of the joining portion 70, and a connector groove 66 corresponding to the joining slot 72 may be formed in the outer peripheral surface of the connector 62. After the joining portion 70 is fitted into the outer peripheral surface of connector 62, the joining portion 70 and the connector 62 may be firmly joined with each other by inserting a pin 74 into both the joining slot 72 and the connector groove 66.

In an example, the cabin 80 may be connected structurally as well as electrically to the integrated two-wheel drive module 10. For example, the power from the battery 22 of the integrated two-wheel drive module 10 may be supplied to the cabin 80 to thus use various electrical products in the cabin 80. Alternatively, a driving range of the integrated two-wheel drive module 10 may be increased by supplying power from a power source (not shown) of the cabin 80 to the integrated two-wheel drive module 10. To this end, a wire 76 extending in a length direction may be disposed in the joining portion 70, may penetrate through the connector 62 and the joining protrusion 60, and may thus be electrically connected to an electrical wiring in the integrated two-wheel drive module 10. In an example, a joining hole (not shown) may be formed in a center portion of the joining protrusion 60 in its length direction, and a cover (not shown) that selectively blocks the joining hole may be elastically mounted on a free surface of the joining protrusion 60. In addition, a connector hole 64 corresponding to the joining hole may be formed at the center portion of the connector 62 in the length direction, and a pusher (not shown) to open the joining hole by pushing the cover may be provided on one surface of the connector 62 that faces the joining protrusion 60. When the connector 62 is coupled to the joining protrusion 60, the pusher may push the cover to open the joining hole. When the joining portion 70 is fitted into the connector 62, the wire 76 in the joining portion 70 may penetrate through the connector hole 64 and the joining hole to be electrically connected to the electrical wiring in the integrated two-wheel drive module 10. The coupling structure of the joining protrusion 60, the connector 62, and the joining portion 70 suggested herein is only an example, and the embodiments of the present disclosure are not limited thereto.

Hereinafter, a method of joining the integrated two-wheel drive module 10 and the cabin 80 according to another embodiment of the present disclosure will be described in detail with reference to FIGS. 8 to 11.

Figure 8:
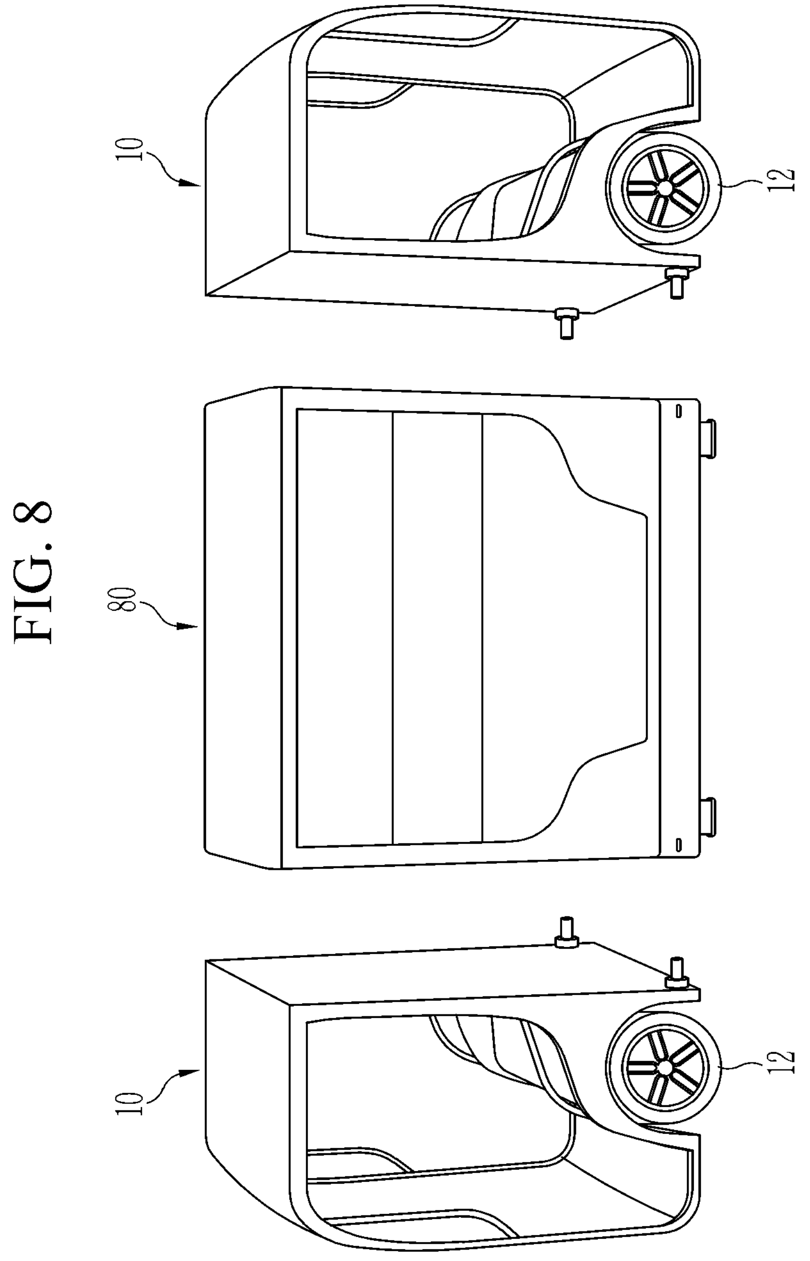
FIG. 8 is a schematic view showing an integrated two-wheel drive module and a cabin before being joined with each other.
Figure 9:
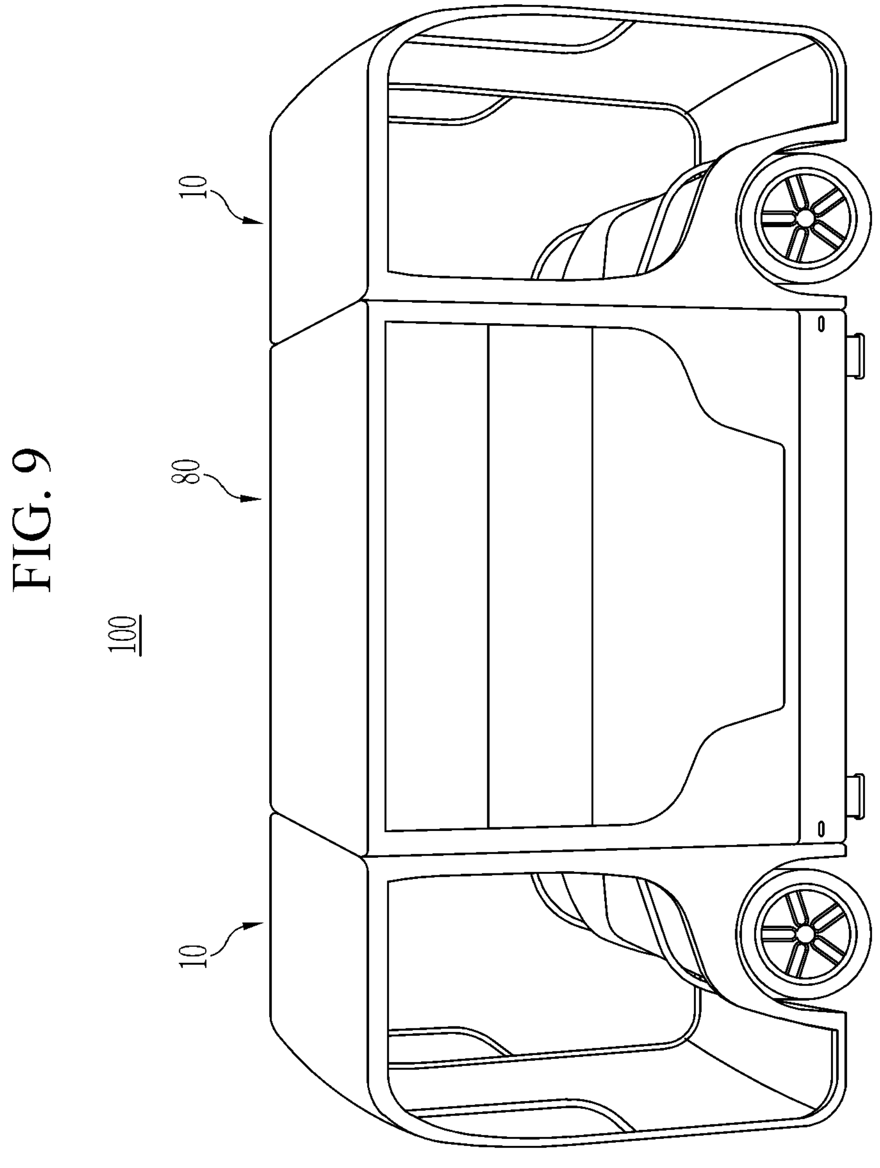
FIG. 9 is a schematic view showing an integrated two-wheel drive module and a cabin while being joined with each other.
Figure 10:
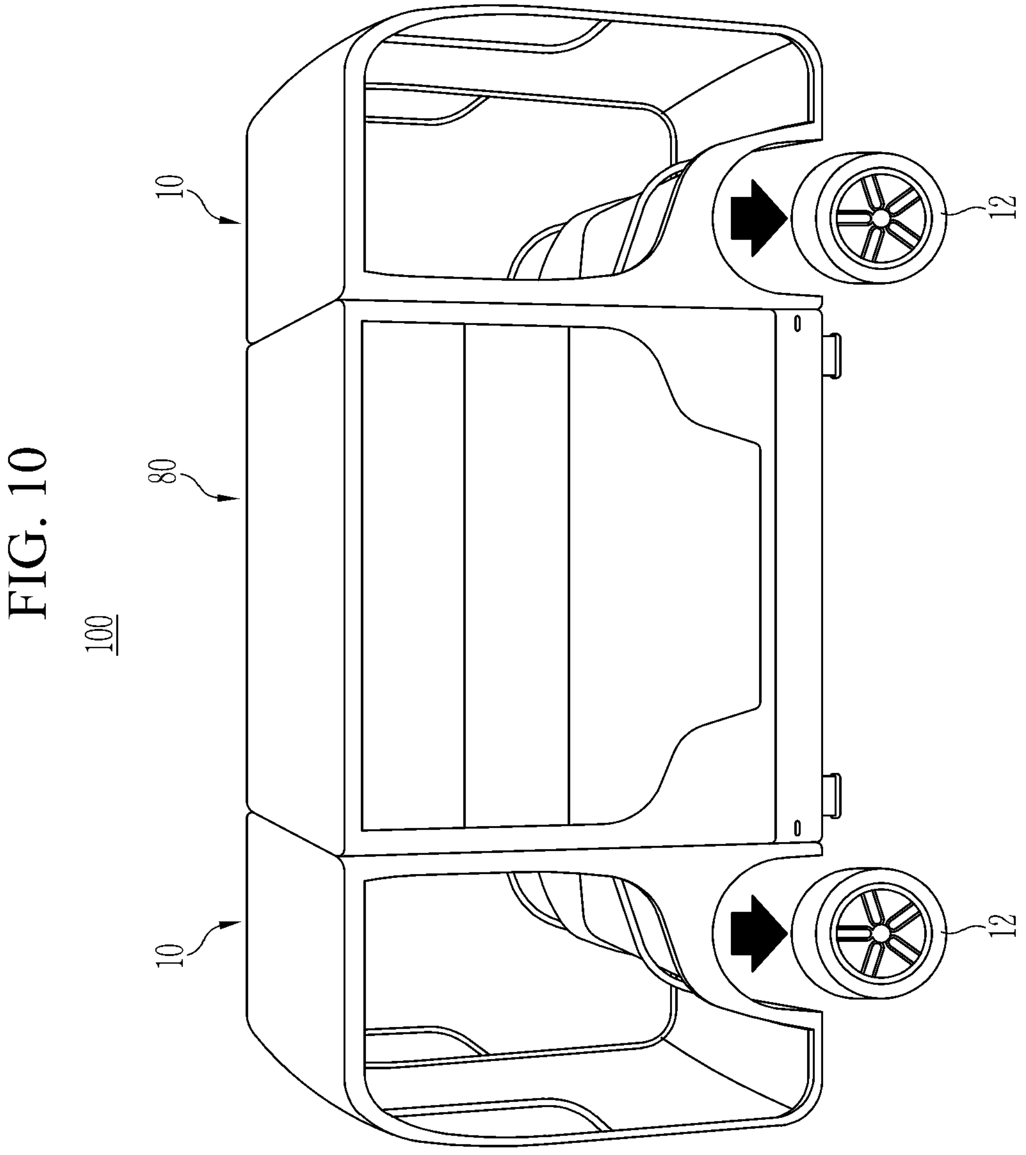
FIG. 10 is a schematic view showing an integrated two-wheel drive module and a cabin after being joined with each other.

FIG. 8 is a schematic view showing an integrated two-wheel drive module and a cabin before being joined with each other; FIG. 9 is a schematic view showing an integrated two-wheel drive module and a cabin while being joined with each other; FIG. 10 is a schematic view showing an integrated two-wheel drive module and a cabin after being joined with each other; and FIG. 11 is a flowchart showing a method of joining an integrated two-wheel drive module and a cabin according to another embodiment of the present disclosure.

FIGS. 8 to 10 exemplify that two integrated two-wheel drive modules 10 and the cabin 80 are joined with each other to become a four-wheel drive mobility 100 for use as a camping car or the like. However, a purpose-built mobility implemented by joining the integrated two-wheel drive module 10 and the cabin 80 is not limited to the four-wheel drive mobility 100.

Figure 11:
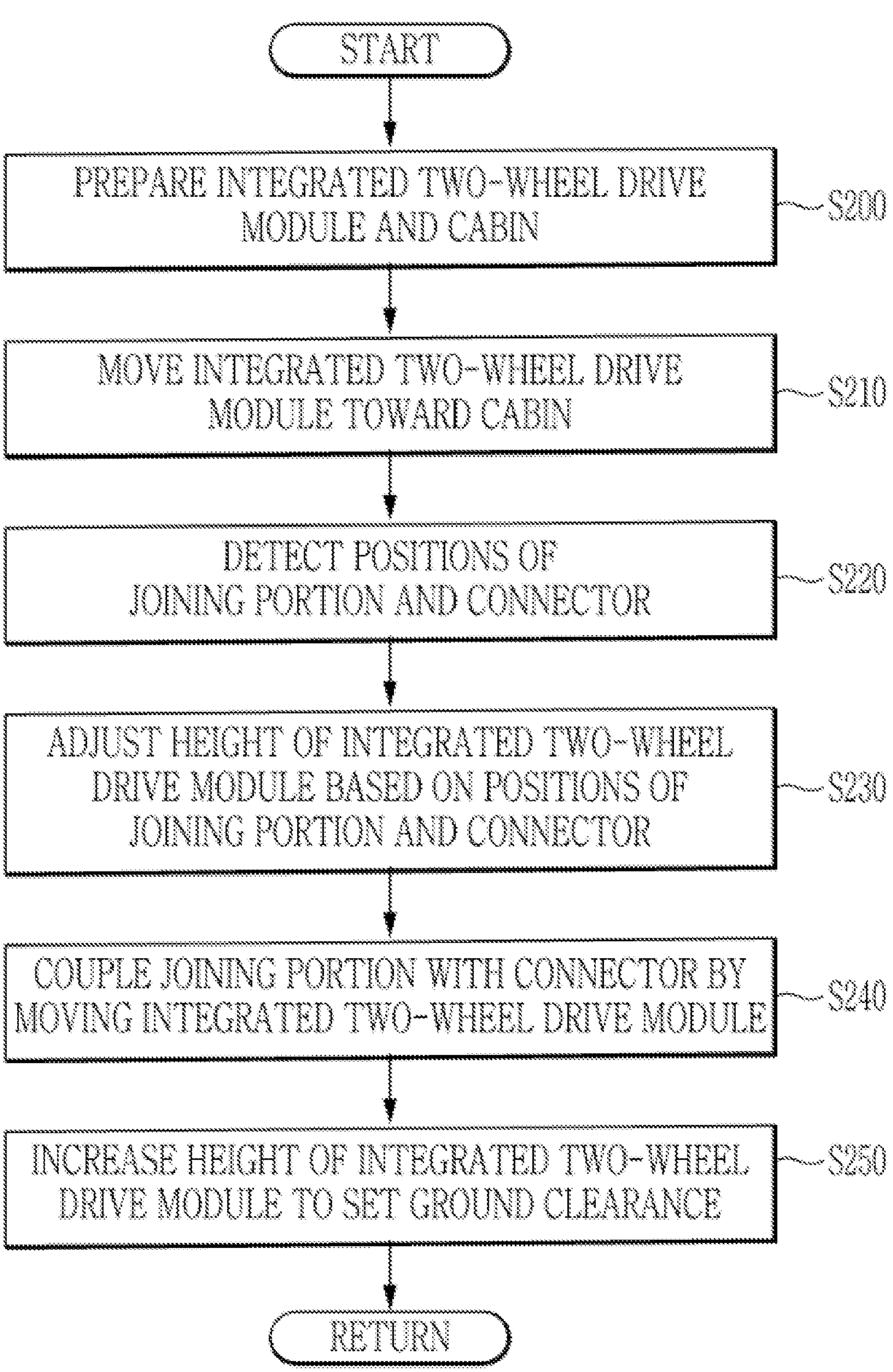
FIG. 11 is a flowchart showing a method of joining an integrated two-wheel drive module and a cabin according to another embodiment of the present disclosure.

As shown in FIG. 11, the method of joining the integrated two-wheel drive module 10 and the cabin 80 according to an embodiment of the present disclosure may begin by preparing the integrated two-wheel drive module 10 and the cabin 80 at step S200. For example, the pair of wheels 12 is mounted on both side surfaces of the module body 20, the in-wheel motor 14 is provided in the wheel frame 13 in each wheel 12, the wheel 12 is rotatable with respect to the wheel frame 13, and the steering device 30 and the suspension 40 connect the wheel frame 13 with the module body 20 such that the wheel frame 13 can rotate in the vertical direction and/or the horizontal direction. As shown in FIG. 5, the plurality of joining protrusions 60 may be provided on the front, the rear, and/or the upper surface(s) of the module body 20, and the connector 62 may be coupled to the protrusion 60 which is selected for being joined with the cabin 80 among the plurality of joining protrusions 60. In addition, the joining portion 70 for being joined with the integrated two-wheel drive module 10 may be provided on the cabin 80.

The controller 24 may move the integrated two-wheel drive module 10 toward the cabin 80 at step S210 when the integrated two-wheel drive module 10 and the cabin 80 are prepared. For example, in response to the input from the user or an input from a server, the controller 24 may detect relative positions of the integrated two-wheel drive module 10 and the cabin 80 through a sensor and control the in-wheel motor 14, the steering device 30, and the suspension 40 to move the integrated two-wheel drive module 10 toward the cabin 80.

For example, as shown in FIG. 8, at the step S210, the cabin 80 may be positioned in a random place, and two integrated two-wheel drive modules 10 may be moved to the front and the rear of the cabin 80. In order to avoid collision with an obstacle on the ground when the integrated two-wheel drive module 10 is moved, a height of the integrated two-wheel drive module 10 may be a predetermined ground clearance through the suspension 40.

The controller 24 may detect a position of the joining portion 70 of the cabin 80 and a position of the connector 62 joined to the integrated two-wheel drive module 10 through the sensor at step S220 when the integrated two-wheel drive module 10 is moved toward the cabin 80. That is, the controller 24 may detect the relative positions of the joining portion 70 and the connector 62.

The controller 24 may adjust the position and the height of the integrated drive module 10 based on the positions of the joining portion 70 and the connector 62 at step S230 when detecting the positions of the joining portion 70 and the connector 62. For example, the controller 24 may control the in-wheel motor 14 and the steering device 30 to position the connector 62 on the same line as the joining portion 70 and control the suspension 40 to lower the height of the integrated two-wheel drive module 10 such that the joining portion 70 and the connector 62 are aligned with each other. That is, the method may not require any separate equipment because the controller 24 lowers the height of the integrated two-wheel drive module 10 instead of lifting the cabin 80 lying on the ground.

The controller 24 may couple the connector 62 with the joining portion 70 by moving the integrated two-wheel drive module 10 at step S240 when the connector 62 is aligned with the joining portion 70. For example, as shown in FIG. 9, the controller 24 may control the in-wheel motor 14 and/or the steering device 30 to move the integrated two-wheel drive module 10 toward the cabin 80. In this case, the joining portion 70 may be fitted into the connector 62, and the pin 74 may be inserted into both the joining slot 72 and the connector groove 66 to thus firmly join the joining portion 70 and the connector 62.

The controller 24 may then control the suspension 40 to increase the height of the integrated two-wheel drive module 10 to the predetermined ground clearance at step S250. For example, as shown in FIG. 10, a bottom of the mobility 100 may be separated from the ground, and the mobility 100 may run without colliding with any obstacle on the ground by increasing the height of the integrated two-wheel drive module 10 to the predetermined ground clearance.

That is, according to another embodiment of the present disclosure, the method may not require any separate equipment because the controller 24 lowers the height of the integrated two-wheel drive module 10 instead of lifting the cabin 80 lying on the ground. Therefore, the integrated two-wheel drive module 10 and the cabin 80 may be easily joined with each other regardless of the location or the equipment. In addition, the purpose-built mobility 100 may be used by replacing the cabin 80 based on a purpose.

Although the embodiments of the present disclosure have been described hereinabove, the scope of the embodiments of the present disclosure is not limited thereto, and all equivalent modifications easily modified by those skilled in the art to which the present disclosure pertains are intended to fall within the scope and spirit of the embodiments of the present disclosure.

What is claimed is:

1. An integrated two-wheel drive module comprising:

a module body having two side portions, wherein a battery and a controller are disposed in the module body, wherein each of the side portions of the module body extends upward to define a space, and wherein an upper end of each of the side portions extends to one side to define a shoulder portion;

a pair of wheels mounted on two side surfaces of the module body, respectively, in the space defined by each side portion of the module body extending upward, wherein wheel frames are disposed in each of the wheels, respectively, and wherein each of the wheels is rotatable with respect to the wheel frame disposed therein;

in-wheel motors mounted in each of the wheel frames, respectively, the in-wheel motors being configured to rotate the wheels by receiving power from the battery under control of the controller;

joining brackets disposed on a first surface of each of the wheel frames, respectively;

a steering device mounted in the module body and connected to each of the wheel frames through respective ball joints; and suspensions mounted between the shoulder portions of the module body and the joining brackets disposed on each of the wheel frames, respectively, wherein the suspensions are configured to absorb an impact of a road surface that is transmitted from the wheels such that the impact is not transmitted to the module body, and wherein the steering device is configured to receive the power from the battery under the control of the controller and rotate the wheel frames in a horizontal direction with respect to connection points between the suspensions and the joining brackets.

2. The module of claim 1, wherein the steering device comprises:

a steering actuator mounted on the module body and operated by receiving the power from the battery under the control of the controller; and a steering rod having a first end connected to the steering actuator to be moved forward or backward by receiving a force from the steering actuator and a second end connected to one of the wheel frames through the ball joints.

3. The module of claim 2, wherein the second end of the steering rod is connected to a selected one of the wheel frames at a front or a rear with respect to an imaginary vertical line passing through the connection point between the suspension and the joining bracket disposed on the selected one of the wheel frames.

4. The module of claim 1, wherein the steering device comprises:

a pair of steering actuators mounted on the module body and operated by receiving the power from the battery under the control of the controller; and a pair of steering rods each having a first end connected to a respective one of the pair of steering actuators to be moved forward or backward by receiving a force from the steering actuators and a second end connected to a respective one of the wheel frames through the ball joints, wherein the pair of steering rods is respectively connected to the wheel frames at a front and a rear with respect to imaginary vertical lines passing through the connection points between the suspensions and the joining brackets.

5. The module of claim 1, wherein the suspensions each comprise:

a suspension damper having a first end coupled to a lower surface of the shoulder portion and a second end extending downward; and a suspension actuator having a first end connected to the second end of the suspension damper and a second end connected to the joining bracket, wherein the suspension actuator is configured to be operated by receiving the power from the battery under the control of the controller.

6. The module of claim 5, wherein the suspension actuator is configured to change a distance between the first end of the suspension actuator and the joining bracket by receiving the power.

7. The module of claim 5, wherein:
- the second end of the suspension actuator has a step portion having a reduced diameter,
- a through hole is disposed at the joining bracket;
- the step portion is insertable into the through hole disposed at the joining bracket; and
- a fixing member is coupled to an outer peripheral surface of the step portion.

8. The module of claim 7, wherein the ball joint is disposed between the second end of the suspension actuator having a diameter larger than that of the step portion and the joining bracket or between the fixing member and the joining bracket.

9. The module of claim 5, wherein the suspension damper is connected to the suspension actuator through a support.

10. An integrated two-wheel drive module, the module comprising:
- a module body having two side portions, wherein a battery and a controller are disposed in the module body, wherein each of the side portions of the module body extends upward to define a space, and wherein an upper end of each of the side portions extends to one side to define a shoulder portion;
- a pair of wheels mounted on two side surfaces of the module body, respectively, in the space defined by each side portion of the module body extending upward, wherein wheel frames are disposed in each of the wheels, respectively, and wherein each of the wheels is rotatable with respect to the wheel frame disposed therein;
- in-wheel motors mounted in each of the wheel frames, respectively, the in-wheel motors being configured to rotate the wheels by receiving power from the battery under control of the controller;
- joining brackets disposed on a first surface of each of the wheel frames, respectively;
- a steering device mounted in the module body and connected to each of the wheel frames through respective ball joints;
- suspensions mounted between the shoulder portions of the module body and the joining brackets disposed on each of the wheel frames, respectively, wherein the suspensions are configured to absorb an impact of a road surface that is transmitted from the wheels such that the impact is not transmitted to the module body, and wherein the steering device is configured to receive the power from the battery under the control of the controller and rotate the wheel frames in a horizontal direction with respect to connection points between the suspensions and the joining brackets;
- a plurality of joining protrusions disposed on an upper, front, or rear surface of the module body; and
- a connector coupled to a selected joining protrusion among the plurality of joining protrusions, wherein the connector is configured to engage with a joining portion disposed on a cabin.

11. The module of claim 10, wherein the connector is screw-coupled to the selected joining protrusion.

12. The module of claim 10, further comprising the joining portion disposed on the cabin, wherein:
- a joining slot penetrating through the joining portion is disposed at a predetermined position of the joining portion;
- a connector groove corresponding to the joining slot is disposed in an outer peripheral surface of the connector; and
- the joining portion and the connector are joined with each other by insertion of a pin into the joining slot and the connector groove.

13. The module of claim 10, wherein the steering device comprises:
- a pair of steering actuators mounted on the module body and operated by receiving the power from the battery under the control of the controller; and
- a pair of steering rods each having a first end connected to a respective one of the pair of steering actuators to be moved forward or backward by receiving a force from the steering actuators and a second end connected to a respective one of the wheel frames through the ball joints, wherein the pair of steering rods is respectively connected to the wheel frames at a front and a rear with respect to imaginary vertical lines passing through the connection points between the suspensions and the joining brackets.

14. The module of claim 10, wherein the suspensions each comprise:
- a suspension damper having a first end coupled to a lower surface of the shoulder portion and a second end extending downward; and
- a suspension actuator having a first end connected to the second end of the suspension damper and a second end connected to the joining bracket, wherein the suspension actuator is configured to be operated by receiving the power from the battery under the control of the controller.

15. The module of claim 14, wherein the suspension actuator is configured to change a distance between the first end of the suspension actuator and the joining bracket by receiving the power.

16. The module of claim 14, wherein:
- the second end of the suspension actuator has a step portion having a reduced diameter,
- a through hole is disposed at the joining bracket;
- the step portion is insertable into the through hole disposed at the joining bracket; and
- a fixing member is coupled to an outer peripheral surface of the step portion.

17. The module of claim 16, wherein the ball joint is disposed between the second end of the suspension actuator having a diameter larger than that of the step portion and the joining bracket or between the fixing member and the joining bracket.

18. A method of joining an integrated two-wheel drive module and a cabin, the method comprising:
- preparing the integrated two-wheel drive module comprising a module body, a battery and a controller disposed in the module body, a plurality of joining protrusions disposed on an upper, front, or rear surface of the module body, a connector coupled to a selected joining protrusion among the plurality of joining protrusions, a pair of wheels mounted on two side surfaces of the module body and being rotatable with respect to wheel frames disposed in each of the wheels, in-wheel motors mounted in the wheel frames and rotating the wheels by receiving power from the battery under control of the controller, steering devices mounted in the module body and connected to the wheel frames through ball joints, and suspensions mounted between the module body and the wheel frames, and the cabin having a joining portion which is engageable to the connector;

moving, by the controller, the integrated two-wheel drive module toward the cabin;

detecting, by the controller, a position of the joining portion of the cabin and a position of the connector joined to the integrated two-wheel drive module;

adjusting, by the controller, a position and a height of the integrated two-wheel drive module based on the positions of the joining portion and the connector; and coupling, by the controller, the connector with the joining portion by moving the integrated two-wheel drive module.

19. The method of claim 18, further comprising inserting a pin into a joining slot penetrating through the joining portion and a connector groove formed in an outer peripheral surface of the connector and corresponding to the joining slot.

20. The method of claim 19, further comprising controlling, by the controller, the suspensions to increase the height of the integrated two-wheel drive module to a predetermined ground clearance.

* * * * *